US008644152B2

(12) United States Patent
Krueger

(10) Patent No.: US 8,644,152 B2
(45) Date of Patent: *Feb. 4, 2014

(54) UPSTREAM DATA RATE ESTIMATION

(75) Inventor: Steven Krueger, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 333 days.

This patent is subject to a terminal disclaimer.

(21) Appl. No.: 12/892,784

(22) Filed: Sep. 28, 2010

(65) Prior Publication Data

US 2011/0013621 A1 Jan. 20, 2011

Related U.S. Application Data

(63) Continuation of application No. 11/555,147, filed on Oct. 31, 2006, now Pat. No. 7,804,777.

(51) Int. Cl.
H04L 12/26 (2006.01)

(52) U.S. Cl.
USPC ......... 370/232; 370/230.1; 370/231; 709/232

(58) Field of Classification Search
USPC .................. 370/230.1, 231; 709/233
See application file for complete search history.

(56) References Cited

U.S. PATENT DOCUMENTS

| 5,724,356 | A | 3/1998 | Parameswaran et al. |
| 6,393,110 | B1 * | 5/2002 | Price .................. 379/93.01 |
| 6,587,875 | B1 * | 7/2003 | Ogus .................... 709/223 |
| 6,681,232 | B1 | 1/2004 | Sistanizadeh et al. |
| 6,859,186 | B2 | 2/2005 | Lizalek |
| 7,548,537 | B2 | 6/2009 | Pfleging et al. |
| 7,706,299 | B2 | 4/2010 | Chang et al. |
| 2005/0060535 | A1 * | 3/2005 | Bartas ................. 713/154 |
| 2006/0002681 | A1 * | 1/2006 | Spilo et al. ............ 386/46 |
| 2006/0221854 | A1 * | 10/2006 | Price et al. ............ 370/253 |
| 2006/0245570 | A1 * | 11/2006 | Pfleging et al. ......... 379/211.02 |

* cited by examiner

Primary Examiner — Omer S Mian
(74) Attorney, Agent, or Firm — Haynes and Boone LLP

(57) ABSTRACT

In one embodiment, a device includes: a transceiver operable to transmit packets to and receive packets from a modem; and a logic engine configured to transmit first packets at a rate through an upstream path for a modem to an Internet node such that no throttling is triggered in the modem, the logic engine being further configured to transmit second packets through the upstream path for the modem to the Internet node at a rate sufficient to trigger throttling in the modem if the modem implements throttling, the logic engine being further configured to compare an average transmission time for first packets to an average transmission time for the second packets to determine whether the modem implements throttling.

8 Claims, 3 Drawing Sheets

UPSTREAM DATA RATE ESTIMATION

RELATED APPLICATION

This application is a continuation of U.S. patent application Ser. No. 11/555,147, filed Oct. 31, 2006, the contents of which are incorporated by reference in their entirety.

TECHNICAL FIELD

The present disclosure relates generally to networks, and more particularly to the estimation of the upstream data rate for network.

BACKGROUND

Common Internet access methods include the use of cable modems or Digital Subscriber Line (DSL). These access methods have a limited amount of upstream bandwidth to accommodate the flow of data to the Internet. However, applications such as Voice over IP (VoIP) will malfunction unless a certain amount of upstream bandwidth is reserved or guaranteed. For example, effective communication through VoIP generally requires a delay of no greater than 100 to 150 milliseconds. The limited upstream bandwidth provided by conventional Internet access methods such as DSL or cable modems is a factor in this delay. If too little upstream data rate is available, the voice data rate is slowed such that the acceptable delay limit will be violated. For example, VoIP implemented with a G.711 codec may require up to 100 kbps in upstream data rate. But note that a VoIP caller may also be emailing others while speaking. In addition, other users of a network serviced by the Internet access method may also be sending data to the Internet. Thus, the network may implement some form of Quality of Service (QoS) to appropriately prioritize data packets. To implement QoS intelligently, a measure of the upstream bandwidth is usually necessary. For example, if the upstream bandwidth is ample enough to accommodate all the upstream data traffic, there would be no need to restrict the transmission of lower-priority data packets. Conversely, if the upstream bandwidth is particularly limited, the transmission of lower-priority data packets may need to be restricted. For example, it is common for a configuration page for a home router to simply ask the user what is the upstream bandwidth. Because cable or DSL modems are generally transparent to the router, a typical user has no intelligent way of assessing the upstream bandwidth. Some network devices such as routers calculate the upstream bandwidth by sending data to a server on the Internet. The upstream data rate (and hence bandwidth) may then be calculated by measuring the time necessary to upload the data to the server. But such a server must be maintained for this purpose and the measurement time taken is the entire transmission time to the server, not just the upstream rate of the Internet access method.

Accordingly, there is a need in the art for improved upstream bandwidth estimation techniques.

Overview

In one embodiment, a device is provided that includes: a transceiver operable to transmit packets to and receive packets from a modem; and a logic engine configured to transmit first packets at a rate through an upstream path for a modem to an Internet node such that no throttling is triggered in the modem, the logic engine being further configured to transmit second packets through the upstream path for the modem to the Internet node at a rate sufficient to trigger throttling in the modem if the modem implements throttling, the logic engine being further configured to compare an average transmission time for first packets to an average transmission time for the second packets to determine whether the modem implements throttling.

In an another embodiment, a device is provided that includes: a transceiver operable to transmit packets to and receive packets from a modem; and means for determining an upstream data rate for the modem, the means being configured to: transmit a first series of pings to a node on the Internet through an upstream data path for the modem; transmit a second series of pings to the node through the upstream data path for the modem at a rate sufficient to induce throttling should the modem implement throttling; compare an average transmission time for the first series of pings to an average transmission time for the second series of pings to determine whether the modem implements throttling; if the modem is determined to implement throttling, determine the upstream data rate for the modem using a total packet size and a total transmission time for the second series of pings; and if the modem is determined to not implement throttling, determine the upstream data rate for the modem using a third series of pings.

In an another embodiment, a method is provided that includes: transmitting a first series of packets to a node on the Internet through an upstream data path for a modem at a rate sufficient so as to not induce throttling should the modem implement throttling; transmitting a second series of packets to the node through the upstream data path for the modem at a rate sufficient to induce throttling should the modem implement throttling; comparing an average transmission time for the first series of packets to an average transmission time for the second series of packets to determine whether the modem implements throttling; if the modem is determined to implement throttling, determining an upstream data rate for the modem using a total packet size and a total transmission time for the second series of packets; and if the modem is determined to not implement throttling, determining an upstream data rate for the modem using a third series of packets.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DESCRIPTION OF EXAMPLE EMBODIMENTS

Figure 1:
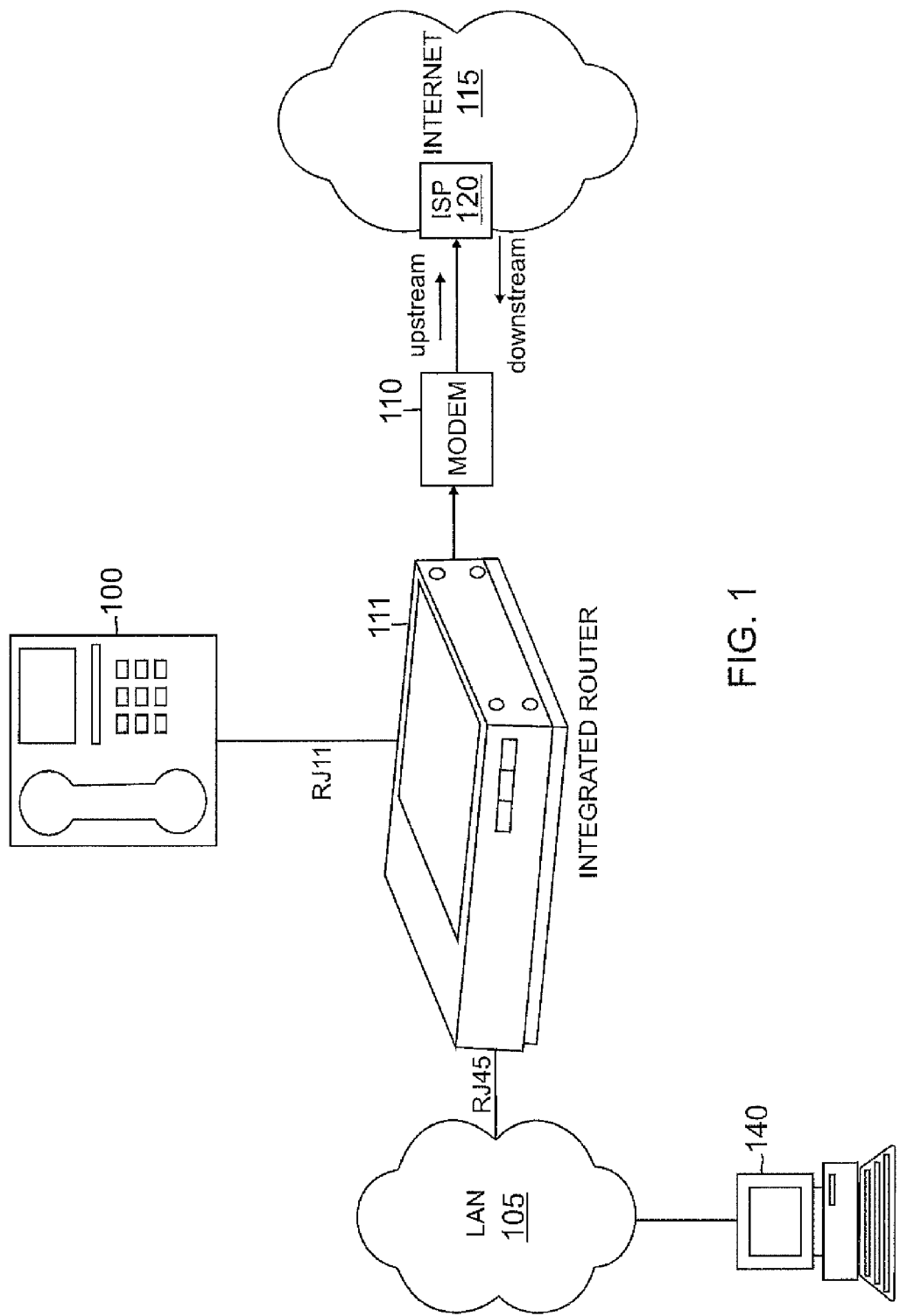
FIG. 1 is a block diagram illustrating an example system including an VoIP-integrated router that estimates an upstream data rate of a modem.

Upstream bandwidth estimation techniques are disclosed that allow network devices such as routers to accurately and quickly estimate the upstream bandwidth for the network's Internet access method. Because the need to estimate upstream bandwidth is particularly acute for VoIP applications, the following example is discussed with regard to a VoIP-integrated router. In general, however, it will be appreciated that any suitable network device may implement the disclosed upstream bandwidth estimation techniques. Turning now to FIG. 1, an example embodiment of an integrated router 111 is illustrated. A modem 110 allows users on a LAN 105 to access content on Internet 115 through communication with a VoIP Internet Service Provider (ISP) server 120. Modem 110 can be any suitable modem such as a DSL modem or a cable modem. As discussed previously, modem 110 has a limited upstream data rate supporting the transmission of digital content to ISP server 120. Typically, this limited upstream data rate would be less than the downstream data rate over which modem 110 may receive content from ISP server 120. However, it will be appreciated that the present invention may be used to estimate the upstream data rate for modem 110 regardless of the relationship between the upstream and downstream data rates.

Integrated router 111 provides the interface between users on LAN 105 and nodes on Internet 115. Integrated router 111 may also be denoted as a residential gateway. The upstream data rate estimation disclosed herein is described with respect to an "initiator" in that the initiator is the network device that performs the upstream bandwidth estimation. For the embodiment illustrated in FIG. 1, it is convenient to use integrated router 111 as the initiator. However, it will be appreciated that the initiator may comprise other network devices. Router 111 is an integrated router in that it supports voice over IP (VoIP) calls as well. Thus, integrated router 111 may include an analog port such as an RJ11 port over which it may communicate with a conventional analog telephone 100. Integrated router 111 includes other ports such an Ethernet RJ45 port over which it communicates with devices on LAN 105 such as a processor 140. These devices on LAN 105 generate IP data packets that integrated router 111 transmits through modem 110 to upstream destinations on Internet 115. In addition, integrated router 111 transmits VoIP packets to upstream destinations on Internet 115 based upon the telephone number dialed on telephone 100. As discussed previously, to satisfy quality of service (QoS) expectations for voice communications, VoIP requires a certain upstream data rate capability for modem 110—for example, VoIP implemented with a G.711 codec may require up to 100 kbps in upstream data rate. To measure the upstream data rate for modem 110 so that data traffic may be limited accordingly, integrated router 111 initiates the measurement by transmitting IP packets through modem 110 and the upstream data rate to a node on Internet 115. Another application which requires a certain QoS to meet user expectations would be, for example, video gaming played over the Internet.

Should LAN 105 comprise a home network, the initiator may calculate the upstream bandwidth to the network's Internet Service Provider (ISP) 120 in that this link is generally the slowest link for such networks. The ISP may also be denoted as the home network's gateway in that the home network accesses the Internet through the ISP. Thus, the following discussion will assume that the IP packets are transmitted to the LAN's gateway 120 although other nodes on the Internet may also be used. It is convenient to form the IP packets as Internet Control Message Protocol (ICMP) ping messages. However, the calculation of the upstream bandwidth using ping messages is complicated by whether modem 110 practices throttling. Throttling is a technique that restricts the upstream bandwidth of a modem if a particular ISP user is sending too much IP data traffic to the ISP. Should throttling be implemented and an initiator attempt to determine the upstream bandwidth by merely sending, for example, a series of pings of various sizes and comparing their return times, the estimation of the upstream bandwidth may be several times too high.

Figure 2:
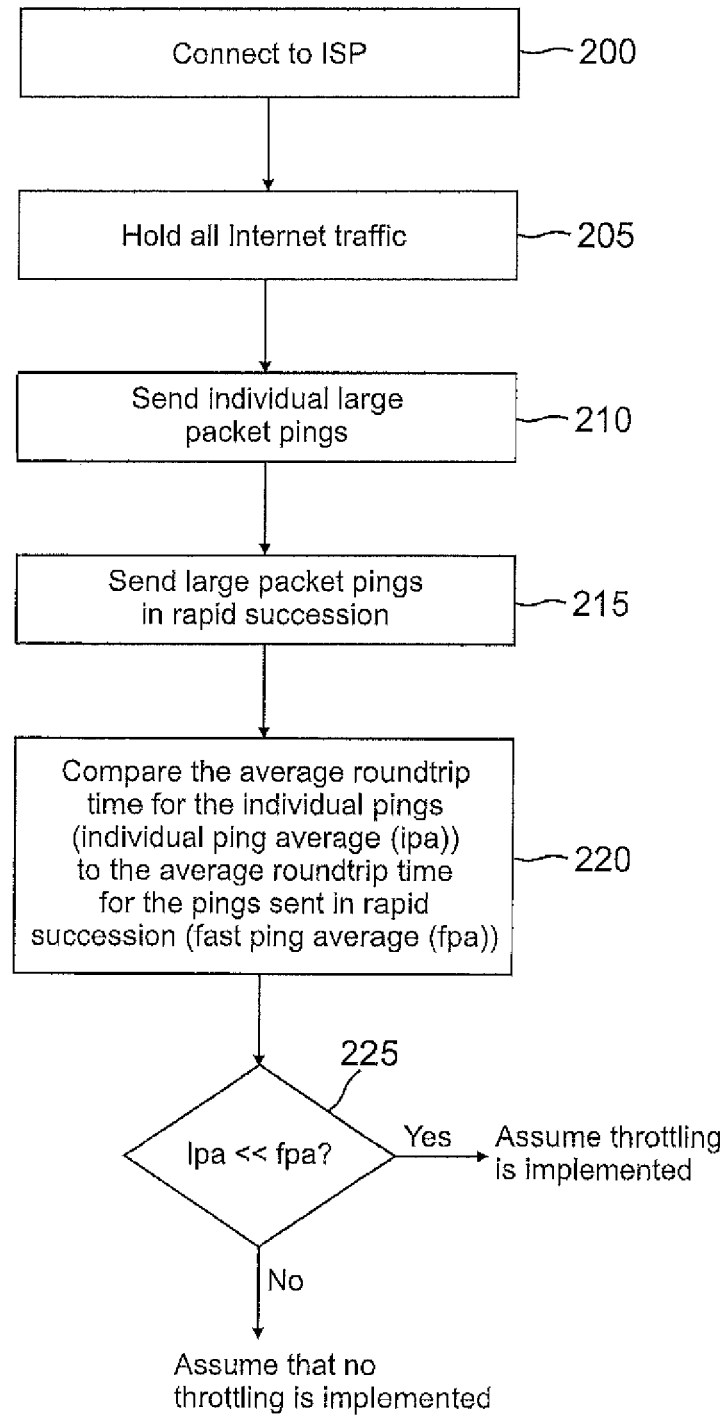
FIG. 2 is a flowchart illustrating an example modem upstream data rate estimation method.

To provide a more accurate estimate, initiator/integrated router 111 may test for throttling at modem 110 as illustrated in the flowchart of FIG. 2. In a first step 200, the initiator connects to the ISP. The initiator may then hold all Internet traffic from other nodes in LAN 105 in a step 205. To determine an un-throttled transmission rate, the initiator may transmit individual pings of a sufficient packet size in a step 210. For example, a ping packet size of 1500 bytes may be used in step 210. The initiator may then calculate the average roundtrip time for these individual large packet pings, which may be represented by a variable denoted as "individual ping average" (ipa). To ensure that these individual large packet pings do not trigger throttling, their transmission times may be separated by several seconds. Conversely, the initiator deliberately incites throttling (if implemented in the modem) in a step 215 by sending large packet pings to the ISP in rapid succession. To avoid being classified as a ping flood, the initiator may delay sending a successive large packet ping in the series of pings transmitted in step 215 until immediately after a reply from the previous large packet ping has been received. The initiator may then calculate the average roundtrip time for the large packet pings sent in rapid succession, which may be denoted as a "fast ping average" (fpa).

Should modem 110 implement throttling, the fast ping average should be significantly greater than the individual ping average. For example, in one test of this throttling determination method, the average roundtrip time for 1468 byte individual pings was 12 milliseconds. Conversely, the total time to send twenty 1468 byte pings in rapid succession (each successive ping transmitted upon receipt of the reply from the previous ping) was 627 milliseconds. Thus the fast ping average was (627/20) milliseconds=31 milliseconds. Because the individual ping average was much less than the fast ping average, it was concluded that the modem in this instance implemented throttling. In general, throttling is virtually always practiced by cable modems because of the limited bandwidth available to a group of users who share a particular cable node. The comparison of the individual ping average to the fast ping average is represented by step 220 in FIG. 2. If this comparison shows that the individual ping average is significantly less than fast ping average in step 225, it may be assumed that throttling is implemented. What constitutes significantly less depends upon the modem implementations but it may be assumed that throttling exists if the individual ping average is less than, for example, 70% of the fast ping average. If the individual ping average is not significantly less than the fast ping average, the initiator assumes that no throttling is implemented in modem 110.

Should the initiator detect in step 225 that throttling is implemented, the estimation of the upstream bandwidth for the modem may neglect the downstream return time because it will be insignificant compared to the delay introduced by the modem on the upstream side of the transmission. The upstream bandwidth is thus the amount of data sent in the fast ping stream divided by the amount of time needed to complete the fast ping transmission. For example, given the total transmission time of 627 milliseconds to send twenty 1468 byte pings discussed previously, the upstream bandwidth is 20*1468/0.627, which equals 45.7 Kbytes/second. In that regard, it will be appreciated that although "bandwidth" generally refers to frequency, because of the equivalency of bandwidth and data rate, the term "upstream bandwidth" and "upstream data rate" are used interchangeably herein. Advantageously, such a method of calculating throttled upstream bandwidth accounts for all overhead time, including the throttling delay in the modem, to provide an accurate estimate.

Should the modem not implement throttling, the initiator cannot assume that the reply time for the pings is insignificant. For example, an non-throttled asymmetric DSL modem (ADSL) would possess different and distinct upstream and downstream bandwidths that must be accounted for to accurately estimate the upstream bandwidth. It may immediately be appreciated, however, the trouble the initiator would have to calculate the upstream bandwidth using only the roundtrip time for a large packet ping. There are two unknowns (the amount of time needed to transmit in the upstream direction and the amount of time needed to transmit in the downstream direction) but only one equation, which may be represented as follows:

$$\text{Roundtrip time} = K + \text{SpeedUp} \cdot \text{SizeUp} + \text{SpeedDown} \cdot \text{SizeDown} \quad \text{Eq (1)}.$$

where K is a constant, SpeedUp represents the upstream data rate, SizeUp represents the packet size in the upstream direction, SpeedDown represents the downstream data rate, and SizeDown represents the packet size in the downstream direction. If SizeUp and SizeDown are the same, there is insufficient information to solve for the upstream data rate. To provide sufficient information to determine the upstream bandwidth, a large packet ping is transmitted with the ping variable Time to Live (TTL) set to one. The variable TTL is decremented at each "hop" as a ping is transmitted through the Internet. Because TTL is one, the first node that the TTL=1 ping is received by in the Internet will return an error reply, which has a constant packet size of 70 bytes. Referring back to FIG. 1, the first hop node in the Internet will generally be ISP 120 in that the nearest Internet host and ISP 120 commonly comprise the same Internet node. However, for generality, these nodes may be considered as independent. The initiator may calculate an un-throttled upstream bandwidth by sending TTL=1 packets of various sizes to the nearest host. For example, the following series of TTL=1 pings may be transmitted: a 100 byte, a 500 byte, a 1000 byte, and a 1400 byte packet TTL=1 ping. Using the terminology from equation (1), SizeUp equals 100, 500, 1000, and 1400 bytes. Suppose the roundtrip times for these pings equals 14.8, 23.4, 36.1, and 45.4 milliseconds, respectively. Because TTL=1 for these pings, SizeDown will equal 70 bytes for all the replies. Because SizeDown is a constant, equation (1) can be simplified and rewritten as:

$$\text{SpeedUp} = (\text{SizeUp}_1 - \text{SizeUp}_2)/(\text{Roundtrip time}_1 - \text{Roundtrip time}_2) \quad \text{Eq. (2)}.$$

For example, should the first and last pings in the preceding example be used, equation (2) leads to an upstream bandwidth of (1400−100) bytes/(45.4−14.8) milliseconds, which equals 328 Kbps. This bandwidth estimation may be averaged using calculations from other pings in the series if desired.

Figure 3:
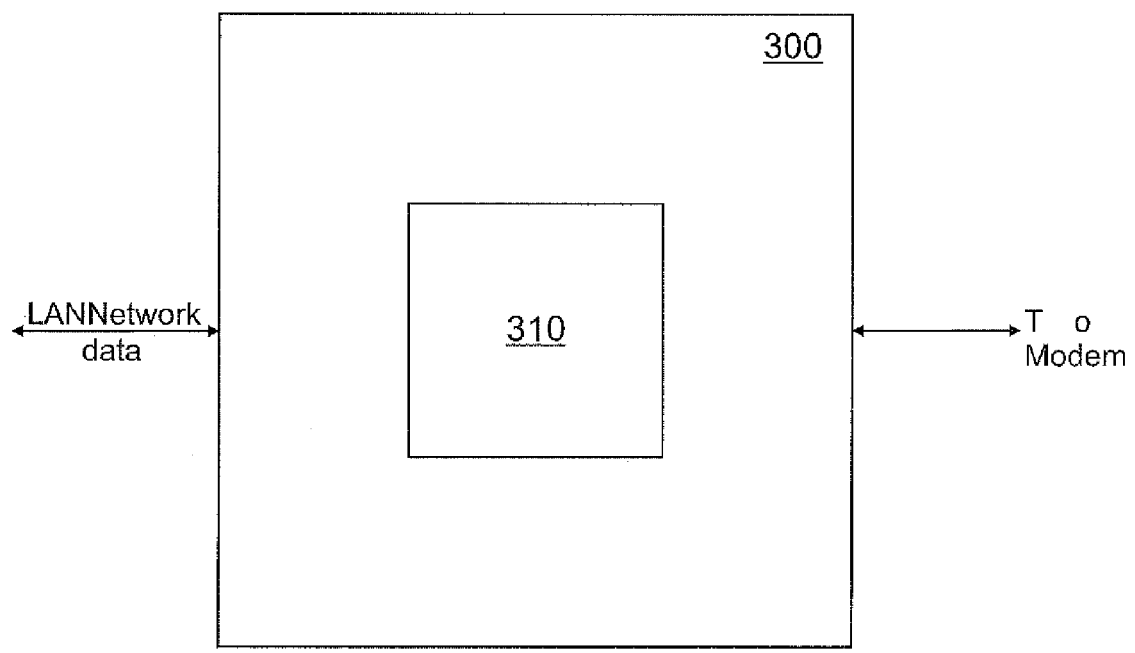
FIG. 3 is a block diagram of a network device configured to estimate the upstream data rate of another network device in accordance with the method of FIG. 2.

It will be appreciated that the disclosed bandwidth estimation technique may be implemented in any suitable network device. For example, a generic network device 300 architecture is shown in FIG. 3. Network device 300 includes a logic engine 310 configured to perform the disclosed upstream data rate estimation. Logic engine 310 may be implemented with dedicated hardware, firmware, or with a general purpose microprocessor. Logic engine 310 estimates the upstream data rate for modem 110. Having estimated the upstream data rate for modem 110, logic engine 310 may limit the transmission of non-VoIP data traffic accordingly through the upstream path for modem 110.

Although the upstream data rate estimation discussed herein has been described with respect to particular embodiments, this description is only an example of certain applications and should not be taken as a limitation. Consequently, the scope of the claimed subject matter is set forth as follows.

I claim:

1. A device of a Local Area Network (LAN) connected to the Internet, the device comprising:
   a transceiver operable to transmit packets to and receive packets from a modem; and
   a logic engine configured to;
   hold all internet traffic from other nodes in the LAN;
   transmit first Internet Control Message Protocol (ICMP) ping packets at a first rate through an upstream path for a modem to an Internet node such that no throttling is triggered in the modem,
   transmit a series of second ICMP ping packets through the upstream path for the modem to the Internet node at a second rate greater than the first rate and sufficient to trigger throttling in the modem, the logic engine being further configured to transmit each successive second ICMP ping packet in the series responsive to receiving a reply message from the previous second ICMP ping packet in the series,
   determine whether a first average roundtrip transmission time for the first ICMP ping packets exceeds by a threshold amount over a second average roundtrip transmission time for the second ICMP ping packets to determine whether the modem implements throttling and,
   responsive to the determination indicating that the modem implements throttling, determine an upstream bandwidth for the upstream path for the modem by averaging a total packet size for the second ICMP ping packets by a total transmission time for the second ICMP ping packets responsive to a determination that the modem implements throttling, and
   limit non-Voice-over-IP (VoIP) data traffic to satisfy a desired quality of service for VoIP data traffic based upon the upstream bandwidth estimation.

2. The device of claim 1, wherein the modem is a cable modem.

3. The device of claim 1, wherein the logic engine is further configured to determine an upstream bandwidth for the modem if the modem is determined to not implement throttling by transmitting third packets of various sizes to a nearest host on the Internet through the upstream path for the modem.

4. The device of claim 3, wherein the third packets comprise ping messages each with a time-to-live variable equaling one.

5. A method, comprising:
   while holding all Internet traffic from nodes, other than a first node, on a Local Area Network (LAN):
   transmitting from the first node in the LAN a first series of Internet Control Message Protocol (ICMP) ping packets to a node on the Internet through an upstream data path for a modem for the LAN at a first rate sufficient so as to not induce throttling should the modem implement throttling,
   transmitting from the first node a second series of ICMP ping packets to the node on the Internet through the upstream data path for the modem at a second rate sufficient to induce throttling should the modem implement throttling, wherein the second rate is greater than the first rate, and wherein the transmission of each successive ICMP ping packet in the second series is responsive to receiving a reply message from the previous ICMP ping packet in the second series,
   determining whether an average roundtrip., transmission time for the first series of ICMP ping packets is greater than a threshold amount over an average roundtrip transmission time for the second series of ICMP ping packets to determine whether the modem implements throttling, and responsive to a determination that the modem implements throttling, determining an upstream data rate for the modem using a total packet size and a total transmission time for the second series of ICMP ping packets; and releasing the hold on the Internet traffic from the other nodes in the LAN while limiting non-Voice-over-IP (VoIP) data traffic through the modem to satisfy a desired quality of service for VoIP data traffic based upon the upstream bandwidth estimation.

6. The method of claim 5, wherein transmitting the first series of ICMP ping packets comprises transmitting a series of ICMP pings to an Internet Service Provider (ISP).

7. The method of claim 5, wherein transmitting the second series of ICMP ping packets comprises transmitting a series of ICMP pings to an Internet Service Provider (ISP).

8. The method of claim 5, wherein transmitting the second series of ICMP ping packets comprises transmitting a series of ICMP pings to a nearest host on the Internet.

* * * * *